United States Patent [19]

Baldwin et al.

[11] 3,781,178
[45] Dec. 25, 1973

[54] PROPELLANT COMPOSITION WITH A HYDROXY-TERMINATED COPOLYMER-BINDER-CATALYST OF BUTADIENE AND ACRYLATE

[75] Inventors: Mart G. Baldwin, Newtown, Pa.; Samuel F. Reed, Jr., Huntsville, Ala.

[73] Assignee: Rohm and Haas Company

[22] Filed: May 13, 1971

[21] Appl. No.: 143,274

Related U.S. Application Data

[60] Division of Ser. No. 849,255, July 31, 1969.

[52] U.S. Cl. .................. 149/19, 149/20, 149/42, 149/44, 149/76
[51] Int. Cl. ............................................. C06b 11/00
[58] Field of Search .................. 149/19, 20, 42, 76, 149/44

[56] References Cited
UNITED STATES PATENTS

3,183,216   5/1965   Cohen et al. .................... 149/19 UX
3,554,819   1/1971   Sayles .............................. 149/42 X
3,617,400   11/1971  Lampert ........................... 149/42 X

*Primary Examiner*—Stephen J. Lechert, Jr.
*Attorney*—Harry M. Saragovitz et al.

[57] ABSTRACT

The copolymers of carboranyl methyl acrylate and butadiene and pertinent solid propellant formulations are disclosed. The copolymers serve as a binder for solid propellant compositions and also serve to increase the burning rate of solid propellants wherein used.

The copolymers are produced in an organic solvent when polymerization is initiated by an azo type initiator selected from the initiators consisting of azo-bis-(2-methyl-5-hydroxy-valeronitrile), azo-bis-(hydroxyethyl-2-methyl propionate), and azo-bis-(2-methyl-3-hydroxypropionitrile).

2 Claims, No Drawings

PROPELLANT COMPOSITION WITH A HYDROXY-TERMINATED COPOLYMER-BINDER-CATALYST OF BUTADIENE AND ACRYLATE

CROSS REFERENCE TO RELATED APPLICATION

This is a division of application Ser. No. 849,255, filed July 31, 1969.

BACKGROUND OF THE INVENTION:

The burning rates of solid propellants can be increased by introduction of certain additives. Many carborane derivatives have been utilized as additives for this purpose, usually in the form of liquids in which state they also serve as plasticizing agents. In the liquid state the carboranes exhibit the inherent disadvantages characteristic of liquid additives such as loss by evaporation, migration, etc.; and consequently, the propellant systems suffer, particularly on long term storage.

Thus, a need exists for a modified form of carborane which form is not subject to being lost by evaporation or migration from a stored propellant composition.

An object of this invention is to provide a liquid copolymer of a carborane additive and a binder material which is not lost by evaporation or migration from a propellant composition wherein contained.

Another object is to provide a copolymer which is capable of being cured to a rubber-like state.

A further object is to provide a propellant formulation having a binder combined with a carborane additive which is effective in increasing the burning rate of a solid propellant composition wherein used.

SUMMARY OF THE INVENTION

Carboranyl methyl acrylate (CMA) is copolymerized with butadiene in an inert organic solvent after the polymerization reaction is initiated by a suitable initiator such as one selected from the initiators consisting of az-o-bis-(2-methyl-5-hydroxy-valerqnitrile), azo-bis-(2-methyl-3-hydroxy-propionitrile), and azobis-(hydroxyethyl-2-methyl propionate). The liquid copolymer is characterized by its molecular weight which is preferably in the range of about 3,500, its hydroxy-end group content of about 0.60 percent and its boron content of about 13.5 percent. The liquid copolymer functions to increase the burning rate of solid propellant compositions as well as functions as a binder for the composition wherein used.

DESCRIPTION OF THE PREFERRED EMBODIMENTS

The copolymer formed by reaction of butadiene with carboranyl methyl acrylate is useful as a binder and also as a burning rate catalyst for solid propellant compositions.

The liquid copolymer is characterized by its preferred molecular weight of about 3,500, its hydroxy-end group content of about 0.60 percent and its boron content of about 13.5 weight percent. The liquid polymer of butadiene and carboranyl methyl acrylate (CMA) is produced by a procedure as described by the descriptive technique set forth below as Example I. Example II sets forth a test propellant composition utilizing the liquid copolymer.

The Butadiene-CMA weight ratio may be varied from approxiamtely 1:5 to 19:1 in preparative procedures.

The copolymers of this invention are tested in a propellant formulation and compared with a formulation utilizing only butadiene. The copolymer includes those containing 5, 10, 15, 20, and about 50 weight percent CMA.

EXAMPLE I

PROCEDURE FOR POLYMERIZATION OF BUTADIENE AND CARBORANYL METHYL ACRYLATE (CMA): To a glass high-pressure reactor (Aerosol tube) is introduced 30 ml of dioxane, 4.88 g. (0.02 moles) carboranyl methyl acrylate (CMA) and 1.65 g. (0.0066 moles) azo-bis-(2-methyl-5-hydroxy-valeronitrile) (AMHV). The reactor is attached to a vacuum line and deaerated by three alternate freeze-thaw cycles. At this point 10.8 g. (0.2 moles) of butadiene is condensed into the reactor, and the reaction is removed from the vacuum line and placed in an oil bath at 66°–67°C. Heating is continued for a period of 72 hours. On cooling, the reactor is vented, the solvent removed by evaporation, and the copolymer reprecipitated by dissolving in ether followed by the addition of methanol. After decanting the solvents, the copolymer is stripped of excess solvents on a rotary evaporator and finally dried at 70°–75°C. under reduced pressure (1 mm) for a period of 24 hours. The liquid copolymer is then characterized by its molecular weight, hydroxy-end group content and elemental analysis. These values are: molecular weight — 3500, hydroxy end group content — 0.60, boron — 13.5 percent (calculated 14.05%).

EXAMPLE II

The propellant test composition set forth below illustrates the use of the copolymer of this invention. The burning rates for the test composition are set forth in Table III wherein the rates are compared with a propellant wherein butadiene in like amount percent by weight is the standard.

Butadiene/CMA copolymer binder — 10.0 wt. %
Isodecyl Pelargonate plasticizer — 10.0
Aluminum Powder — 10.0
Ammonium Perchlorate (56$\mu$) — 70.0

Table I provides data for preparation of butadiene-CMA Copolymers. Polymerization temperatures may conveniently be maintained in the range of 60–80°C. Reaction times may vary between 24–120 hours. The preferred range for reaction is about 72 hours.

Physical property data on the copolymers is given in Table II.

Burning rate data for the propellant test compositions of EXAMPLE II is set forth under Table III. The data indicates that carborane included as part of the propellant binder is effective in increasing the burning rate.

TABLE I
Experimental Data for Preparation of Butadiene-CMA Copolymers: Temp., 66–67° C.; time, 72 hours

| Number | Butadiene, grams | CMA, grams | AMHV, moles | Molar ratio of monomers | Solvent, 30 ml. | Weight polymer, grams | Percent yield |
|---|---|---|---|---|---|---|---|
| 1 | 10.8 (0.2 mole) | 4.88 (0.02 mole) | 0.0066 | 10/1 | Dioxane | 8.0 | 51 |
| 2 | 10.8 (0.2 mole) | 4.88 (0.02 mole) | 0.0066 | 10/1 | Toluene | 7.9 | 50 |
| 3 | 10.8 (0.2 mole) | 4.88 (0.02 mole) | 0.0066 | 10/1 | DMF | 6.1 | 39 |
| 4 | 10.8 (0.2 mole) | 9.76 (0.04 mole) | 0.0072 | 5/1 | Dioxane | 8.8 | 43 |
| 5 | 10.8 (0.2 mole) | 14.64 (0.06 mole) | 0.0078 | 3.3/1 | ...do | 11.3 | 44 |
| 6 | 19.0 (0.35 mole) | 1.0 (0.0044 mole) | 0.0107 | 87.5/1 | ...do | 11.8 | 59 |
| 7 | 18.0 (0.33 mole) | 2.0 (0.0088 mole) | 0.0103 | 37.5/1 | ...do | 12.1 | 60 |
| 8 | 17.0 (0.32 mole) | 3.0 (0.0131 mole) | 0.0098 | 24/1 | ...do | 11.9 | 59 |
| 9 | 15.0 (0.28 mole) | 5.0 (0.022 mole) | 0.009 | 15.7/1 | ...do | 9.7 | 48 |

TABLE II
Physical Property Date on Butadiene-CMA Copolymers

| No. | Molecular Weight | Weight % OH Calc'd*/Found | | %B in Polymer Calc'd.**/Found | |
|---|---|---|---|---|---|
| 1. | 3500 | 0.97 | 0.60 | 14.05 | 13.5 |
| 2. | 3200 | 1.06 | 0.95 | 14.05 | 8.4 |
| 3. | 2900 | 1.17 | 1.02 | 14.05 | 11.0 |
| 4. | 3700 | 0.92 | 0.84 | 21.65 | 15.8 |
| 5. | 3000 | 1.13 | 0.62 | 24.7 | 20.4 |
| 6. | 3200 | 1.06 | 1.36 | 2.32 | 2.00 |
| 7. | 3300 | 1.03 | 1.31 | 4.69 | 4.20 |
| 8. | 3600 | 0.94 | 1.0 | 4.02 | 7.8 |
| 9. | 2600 | 1.31 | 1.04 | 10.07 | 8.1 |

\* Calculated OH content is based on observed molecular weight, with the assumption that each molecule contains two hydroxyl groups.
\*\* Based on monomer charge.

TABLE III
Burning Rate Data on Butadiene-CMA Copolymers in Propellant Formulations

| Copolymer No. | Boron Content (% of propellant) | Burning Rate (in/sec) 800–824 psi | 1600–1615 psi |
|---|---|---|---|
| Standard | 0 | 0.501 | 0.797 |
| 6 | 0.20 | 0.529 | 0.816 |
| 7 | 0.42 | 0.542 | 0.858 |
| 8 | 0.78 | 0.558 | 0.910 |
| 9 | 0.81 | 0.660 | 1.033 |

The copolymers of this invention include those copolymers containing from about 5 to about 50 weight percent carboranyl methyl acrylate with the remaining weight percent of copolymer being reacted butadiene. The amount of the copolymer when used in propellant formulations can vary from about 5 to about 30 weight percent. The burning rates of the propellant increase with increased boron content; therefore, a copolymer with a higher weight percent of carboranyl methyl acrylate in the copolymer composition and the use of a correspondingly higher weight percent of copolymer in the propellant formulation provides a means of providing even higher burning rates than those illustrated in Table III. The test formulation set forth in Table III was selected for its ease of preparation and reproducibility rather than for its high burning rate. Hence the use of about 10 weight percent binder does provide lower burning rate control as desired. However, the use of a higher weight percent binder having a higher carboranyl methyl acrylate content is preferred if a high burning rate propellant is desired.

We claim:

1. A propellant composition comprising isodecyl pelargonate plasticizer; aluminum powder; ammonium perchlorate; and the hydroxyl terminated-copolymers of butadiene and carboranyl methyl acrylate prepared by the method which comprises reacting together carboranyl methyl acrylate; polymerization initiator selected from azo-bis-(2-methyl-5-hydroxyvaleronitrile), azo-bis-(2-methyl-5-hydroxypropionitrile), and azo-bis-(hydroxyethyl-2-methyl propionate) in an inert organic solvent, said solvent selected from dioxane, toluene, and dimethyl formamide; and butadiene at a reaction temperature in the range of about 70°C to about 75°C and for a reaction time period from about 24 hours to about 120 hours to form said copolymers; effecting solvent removal from said copolymers; and drying said copolymers at reduced pressure in the range of about 1 millimeter, said butadiene to carboranyl methyl acrylate being reacted in ratio of about 1:5 to about 19:1 to yield hydroxy terminated copolymers characterized by a molecular weight range from about 2,600 to about 3,700, a hydroxy-end group content in the range from about 0.60 weight percent to about 1.36 weight percent, a boron content in the range of about 2 to about 20.4 weight percent, and said copolymers containing from about 5 to about 50 weight percent carboranyl methyl acrylate and said propellant composition containing up to about 30 weight percent of said copolymers.

2. The propellant composition of claim 1 and wherein said composition is comprised of said copolymers in the amount of about 10.0 weight percent, isodecyl perlargonate plasticizer in the amount of about 10.0 weight percent, and ammonium perchlorate in the amount of about 70.0 weight percent.

\* \* \* \* \*

UNITED STATES PATENT OFFICE
CERTIFICATE OF CORRECTION

Patent No. 3,781,178          Dated December 25, 1973

Inventor(s) Mart G. Baldwin et al.

It is certified that error appears in the above-identified patent and that said Letters Patent are hereby corrected as shown below:

On the cover sheet, in the heading, item [73] Assignee: "Rohm and Haas Company" should read -- United States of America as represented by the Secretary of the Army --.

Signed and sealed this 14th day of May 1974.

(SEAL)
Attest:

EDWARD M. FLETCHER, JR.
Attesting Officer

C. MARSHALL DANN
Commissioner of Patents

FORM PO-1050 (10-69)